Nov. 25, 1924.
KÁLMÁN V. KANDÓ
1,517,117
PHASE CONVERTER
Filed Sept. 17, 1920
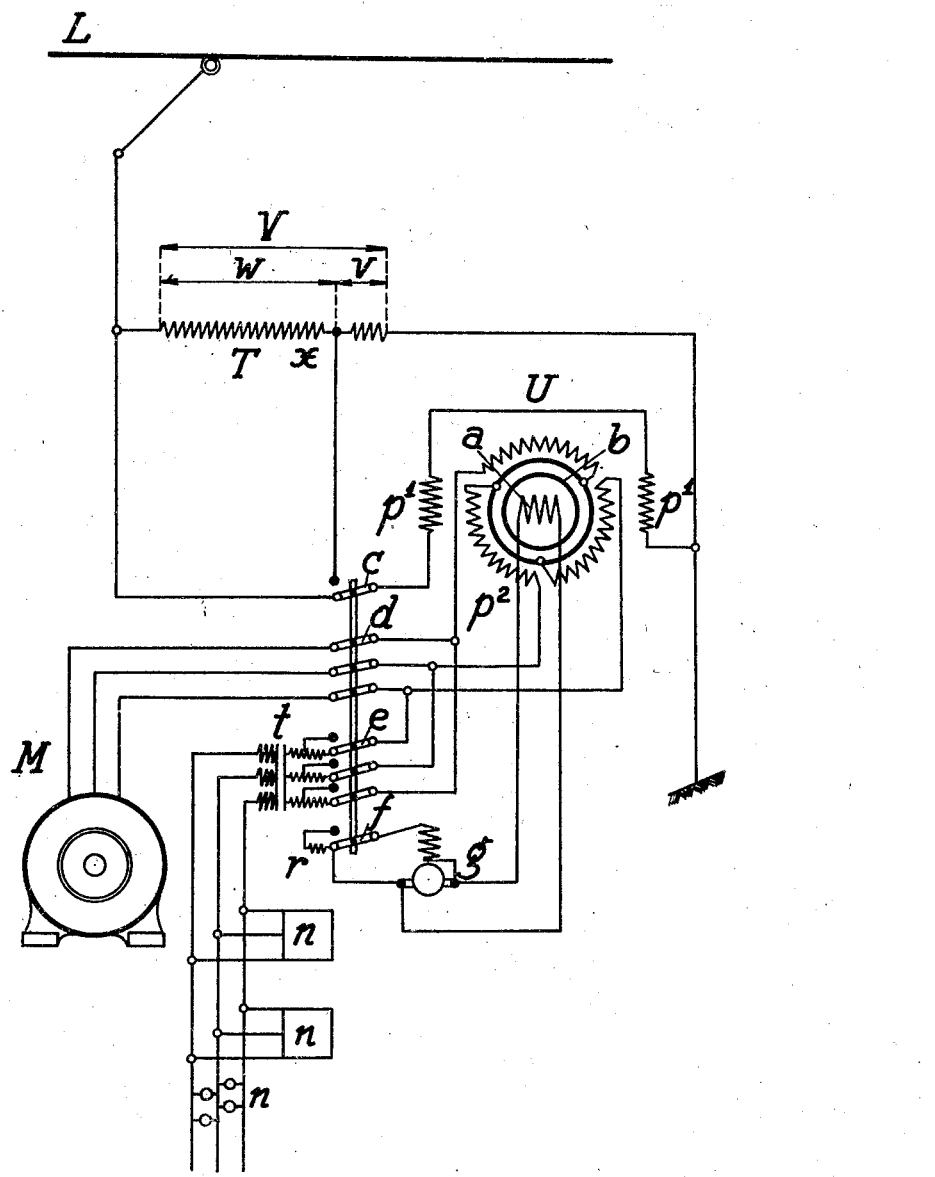
Inventor:
Kálmán von Kandó,
by Emery, Booth, Janney & Varney
Attys Patented Nov. 25, 1924.

1,517,117

UNITED STATES PATENT OFFICE.

KÁLMÁN v. KANDÓ, OF BUDAPEST, HUNGARY.

PHASE CONVERTER.

Application filed September 17, 1920. Serial No. 411,014.

*To all whom it may concern:*

Be it known that I, KÁLMÁN VON KANDÓ, a citizen of Hungary, residing at Budapest, in the Kingdom of Hungary, have invented certain new and useful Improvements in Phase Converters, for which I have filed applications in Hungary August 30, 1916, Germany February 13, 1918, and Austria May 19, 1919, and of which the following is a specification.

My invention relates to phase-converters of the synchronous type and more especially to means for reducing the no-load-work of such converters.

I use for supplying multiphase motors with current from a single-phase line, phase-converters of the synchronous type with direct current excitation, such converters permitting the maintenance of a good power factor. As such phase-converters are somewhat difficult to start, it is advisable to keep the phase-converter running idle during certain rest periods. However the energy utilized by the converters represents a considerable loss of energy.

According to my invention I provide means for permitting a change in the self-induction of the primary circuit of the phase-converter. By actuating a switch for controlling said means simultaneously with the main switch of the motor, to which current is supplied by the phase-converter, at the switching off of the motor, the self-induction of the primary circuit of the converter will be raised.

The annexed drawing shows diagrammatically an example of my invention.

Referring to the drawing L is a single-phase high-voltage line, U a rotary phase-converter, $p^1$ the single-phase primary winding and $p^2$ the three-phase secondary winding of the stator of the converter supplying the current for the three-phase motor M. $a$ is the field winding of the rotor of the converter fed with direct current by the exciter $g$. $b$ is a short-circuit winding provided on the rotor for the purpose of starting. $d$ is a switch to connect to or disconnect the motor M from the secondary circuit of the phase-converter V.

According to my invention, I provide means allowing the raising, during the idle running of the converter, of the self-induction of the primary circuit winding of said converter from a degree commensurate with the full load of the converter if the motor M is connected to the converter to a degree that will cause the voltage of the primary circuit $p^1$ to be depressed preferably to a point sufficient to keep the converter in synchronism.

In the drawing I have shown for sake of illustration an autotransformer T shunted with the primary winding $p^1$ of the phase-converter. $c$ is a double-throw-switch permitting the connection of the primary circuit $p^1$ of the converter from the end-terminal of the autotransformer to an intermediate terminal $x$, raising thus the self-induction of the primary circuit and accordingly lowering the voltage impressed on the phase-converter.

The double-throw switch $c$ is coupled in any well known manner for example by mechanical, hydraulic, pneumatic or electromagnetic means with the main switch $d$ of the motor M in such a way, that as long as the circuit of the motor M is closed, the primary circuit $p^1$ of the converter is connected to the end-terminal of the autotransformer T and receives the total voltage V, while simultaneously with the switching off of the motor M the double-throw switch $c$ will be shifted to the intermediate terminal $x$ of the autotransformer, thereby connecting in series with the primary circuit $p^1$ of the converter the self-induction of the part $w$ of the autotransformer-winding. Hence the primary circuit $p^1$ of the converter will be set under the reduced pressure $v$. This voltage $v$ may be preferably reduced to a point sufficient merely to keep the phase-converter running in synchronism.

It should however be understood, that the invention is not limited to the use of said transformer.

$r$ is a resistance and $f$ a switch for controlling the same, said switch being preferably coupled with the switches $c$ and $d$ so that the resistance $r$ will be connected into the field circuit of the exciter $g$ when the motor M is switched off and the input side of the phase converter is set under the reduced pressure $v$, whereby the excitation of the converter will during its idle running be reduced to a minimum degree.

If however the pressure $v$ corresponding to the idle running of the converter is low enough, the switch $f$ may completely interrupt the field circuit of the exciter $d$ instead of switching in the resistance $r$. In such case the currents induced in the short-circuited winding b of the rotor of the converter will produce, during its idle running the torque necessary to keep the converter in rotation.

The secondary circuit of the converter may supply low voltage current to auxiliary devices as for example the lamps $n$, $n$ of a train. For these purposes the low-voltage can be taken for example from intermediate terminals of the secondary winding of the converter or by reducing the secondary voltage of the converter by means of a transformer to the desired low voltage. Thus separate high-voltage transformers can be dispensed with. In both cases the voltage used to feed the auxiliary devices would be altered by the changing over of the primary circuit of the converter at the switching off of the motor M. But as the auxiliary devices must be kept working also during the period, when the motor M is switched off, said change of voltage is inadmissible. Hence my invention relates further to means for preventing a change of the voltage of the current feeding the auxiliary devices at the switching on or off of the motor. I provide for this purpose means for altering the ratio of transformation of the current feeding the auxiliary devices, said means being coupled with the switches $c$, $d$ and $e$, so that at the switching off of the motor M, the ratio of transformation in said branch-circuit will be raised in the same proportion as the voltage impressed to the primary circuit of the converter will be reduced. Hence the voltage of the secondary branch-circuit feeding the auxiliary devices will not be altered by the switching on or off of the motor M.

Referring to the drawing, $t$ is a small low-voltage transformer branched off from the secondary circuit of the phase-converter V and reducing the secondary terminal voltage of the converter to as low a voltage as is needed to feed the different auxiliary devices. $e$ is a double-throw switch adapted to change the ratio of transformation of the transformer $t$ in the same ratio, as the voltage V impressed on the primary circuit $p^1$ of the phase-converter will be reduced by the switch $c$ to the voltage $v$. The switch $e$ is coupled with the other switches $c$, $d$ and $f$, so that if the motor M is switched off and the voltage V is reduced to $v$, the switch $e$ will increase the ratio of transformation of the transformer $t$ in the proportion V, hence the secondary voltage of transformer $t$ will not be altered, in spite of the change in the primary of the phase-converter.

What I claim is:

1. In combination with a rotary phase-converter of the synchronous type, a primary circuit, a secondary circuit, an electric motor, switches to switch the said motor into the said secondary circuit, a branch circuit derived from the secondary circuit of the phase-converter with lower pressure than the secondary terminal pressure of the phase-converter, means to increase the self-induction of the said primary circuit and to keep unaltered the pressure of the said branch circuit at the switching off of the motor.

2. In combination with a rotary phase-converter of the synchronous type, a direct current field winding on said phase-converter, an exciting generator feeding said field winding, a primary circuit, a secondary circuit, electric motors, switches to switch the said motors into the said secondary circuit, means to increase the self-induction of the said primary circuit and means to reduce the exciting current produced by said exciting generator at the switching off of the motors.

3. In combination with a rotary phase-converter of the synchronous type, a primary circuit, a secondary circuit, an electric motor, switches to switch the said motor into the said secondary circuit, a branch circuit derived from the secondary circuit of the phase-converter, a transformer in said branch circuit, means to increase the self-induction of the said primary circuit and means to alter the ratio of transformation of said transformer.

4. In combination with a rotary phase-converter of the synchronous type, a primary circuit, a secondary circuit, electric motors, switches to switch said motors into the said secondary circuit, means to increase the self-induction of the said primary circuit and a positive coupling between said means and the switches of the motors.

5. In combination with a rotary phase-converter of the synchronous type, a primary circuit, a secondary circuit, electric motors, switches to switch the said motors into the said secondary circuit, a branch circuit derived from the secondary of the phase-converter with lower pressure than the secondary terminal pressure of the phase converter, means to increase the self-induction of the said primary circuit, switches to control said means, and means to keep unaltered the pressure of the said branch circuit at the switching off of the motors, switches to control said means and a positive coupling between the switches of the motors and the switches controlling the terminal pressure of the primary circuit and of the branch circuit.

6. In combination with a rotary phase-converter of the synchronous type, a direct current field winding on said phase-converter, an exciting generator feeding said field winding, a primary circuit, a secondary circuit, electric motors, switches to switch the said motors into the said secondary circuit, a branch circuit derived from the secondary circuit of the phase-converter with lower pressure than the secondary terminal pressure of the phase-converter, means to increase the self-induction of the said primary circuit, switches to control said means, and means to keep unaltered the pressure of the said branch circuit at the switching off of the motors, switches to control said means, and switches to cut off the exciting current produced by the said exciting generator and a positive coupling between the switches of the motors and the switches controlling the admission of the exciting current and the terminal pressure of the primary circuit and of the branch circuit.

In testimony whereof I affix my signature in presence of two witnesses.

KÁLMÁN v. KANDÓ.

Witnesses:
S. B. VAUGHAN,
EUG. KANSAMY.